July 18, 1967

A. BRUNNER 3,331,202

STEAM POWER PLANT

Filed Feb. 8, 1966

Inventor:
ALFRED BRUNNER
BY
Kenyon & Kenyon
ATTORNEYS

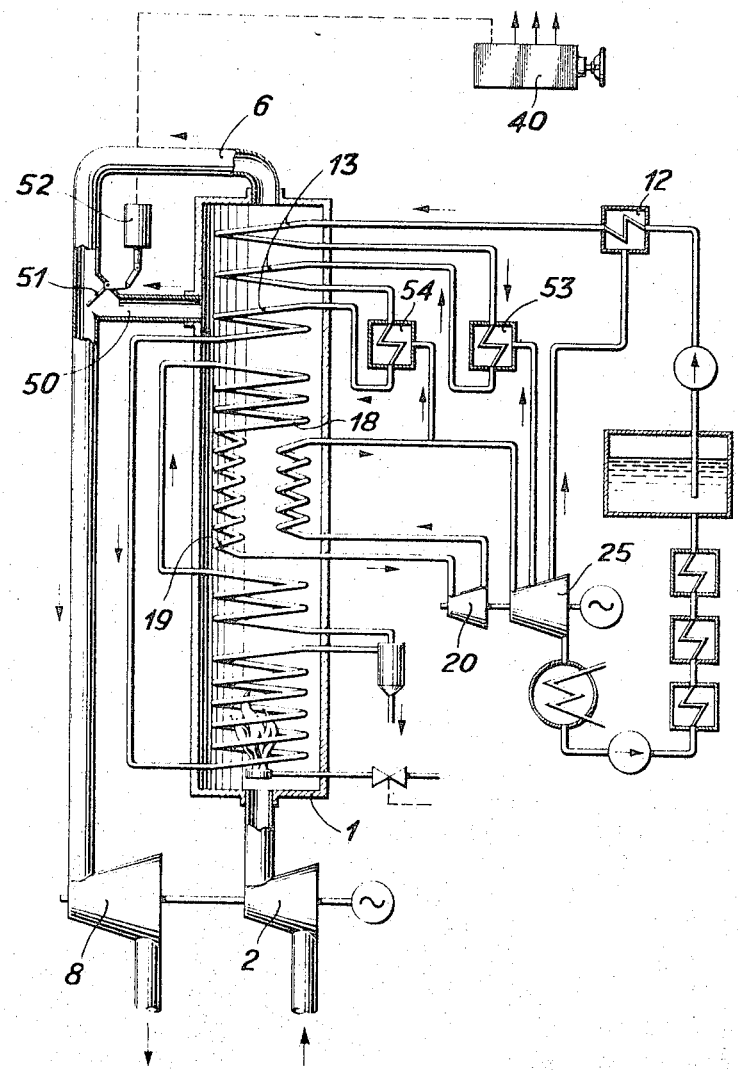

United States Patent Office 3,331,202
Patented July 18, 1967

3,331,202
STEAM POWER PLANT
Alfred Brunner, Winterthur, Switzerland, assignor to Sulzer Brothers, Limited, Winterthur, Switzerland, a corporation of Switzerland
Filed Feb. 8, 1966, Ser. No. 525,890
Claims priority, application Switzerland, Feb. 15, 1965, 2,015/65
11 Claims. (Cl. 60—39.18)

This invention relates to a steam power plant. More particularly, this invention relates to a steam power plant in which a steam generator supplies flue gas to a gas turbine for driving a compressor to compress the combustion supporting air delivered to the steam generator. Still more particularly, this invention relates to a steam power plant of the above type which varies the heat exchange between the flue gases and load medium to control the temperature of the flue gases leaving the steam generator.

Heretofore, steam power plants which have utilized the steam generator as a supplier of flue gas for a turbine which drives a compressor for compressing the combustion supporting air delivered to the steam generator have coupled an electric motor to the turbine-compressor assembly to provide the necessary drive for the turbine-compressor assembly when the steam power plant is operating on low load. However, this extra electric power consumption is a disadvantage since it impairs the overall efficiency of the power plant.

Generally, the invention provides a means to vary the proportional distribution of the load medium or flue gases of a steam power plant as between various flow paths so as to vary the heat exchange between the flue gases and the load medium to control the temperature of the flue gases leaving the steam generator.

In one form, the invention includes a steam generator, a flue gas burner, a turbine which is driven by the flue gases of the steam generator, a compressor which is driven by the turbine for compressing the combustion supporting air delivered to the generator, an economiser bypass and a means responsive to the flue gas output of the steam generator for actuating the econimiser bypass to control the temperature of the flue gases leaving the steam generator. Whenever the temperature or pressure of the flue gas leaving the steam generator increases, the speed of the compressor is increased to increase the pressure of the combustion supporting air delivered to the steam generator so as to increase the heat taken up by the load medium through the contact heating surfaces while the bypass is actuated to increase the flow of load medium through the economiser.

Alternatively, another form of the invention provides a means responsive to the temperature of the load medium for actuating the economiser bypass to control the temperature of the flue gases leaving the steam generator.

Further, another form of the invention provides an economiser bypass for the flue gases of the steam generator which varies the quantity of gases passing over the economiser heating surface in dependence on the load.

In all of these cases, the invention, by enabling the heat exchange between the flue gases and the load medium to be varied, widens the plant load range in which no extra electric drive is required for the turbine-compressor assembly with a consequent increase on the overall efficiency of the plant. It is noted that the turbine-compressor assembly needs an electric driving motor only for the first stage of plant start-up, so that the performance and speed of the electric motor need be merely such as required for a very small load. When the steam generator has reached this load, the electric motor can be stopped or disconnected, whereafter the turbine-compressor assembly and the plant are run up to higher loads solely by the gas turbine drive. Further, the speed can be increased beyond the speed attainable with squirrel-cage motors operating on 50 c./s. A.C. Consequently, the turbine compressor assembly and electric motor can be smaller than in heretofore known plants. Since the turbine-compressor assembly speed can be varied readily, so can the pressure of the flue gases in the steam generator and therefore so can the heat take-up of the load medium in the contact-heated heating surfaces. As a result of this effect, either the temperatures of the high-pressure steam and possibly of the intermediately superheated steam can be controlled or, where a control system has been previously provided the control range for the latter temperatures can be increased. Flue gas temperature alternations at the steam generator exit due to changing loads can be reduced; consequently, full load operation at a relatively low flue gas exit temperature is possible without any risk of corrosion on partial load.

Accordingly, it is an object of the invention to provide a steam power plant with a means to vary the heat exchange between flue gases and a load medium in a steam generator to control the temperature of the flue gases leaving the steam generator.

It is another object of the invention to provide a steam power plant with a means to vary the proportional distribution of the load medium in a steam generator as between various flow paths so as to vary the heat exchange between the flue gases and load medium in the steam generator to control the temperature of the flue gases leaving the steam generator.

It is another object of the invention to provide a steam power plant with a means to vary the proportional distribution of the flue gases in a steam generator as between various flow paths so as to vary the heat exchange between the flue gases and load medium in the steam generator to control the temperature of the flue gases leaving the steam generator.

It is another object of the invention to control the temperature of the flue gases leaving the steam generator of a steam power plant in response to the pressure of the exiting flue gases.

It is another object of the invention to control the temperature of the flue gases leaving the steam generator of a steam power plant in response to the temperature of the load medium at a point in the flow path after being superheated.

These and other objects and advantages of the invention will become more apparent from the following detailed description and appended claims taken in conjunction with the accompanying drawings in which:

FIG. 5 shows a steam power plant comprising a flue-gas line which bypasses the economiser heating surface.

Figure 1:
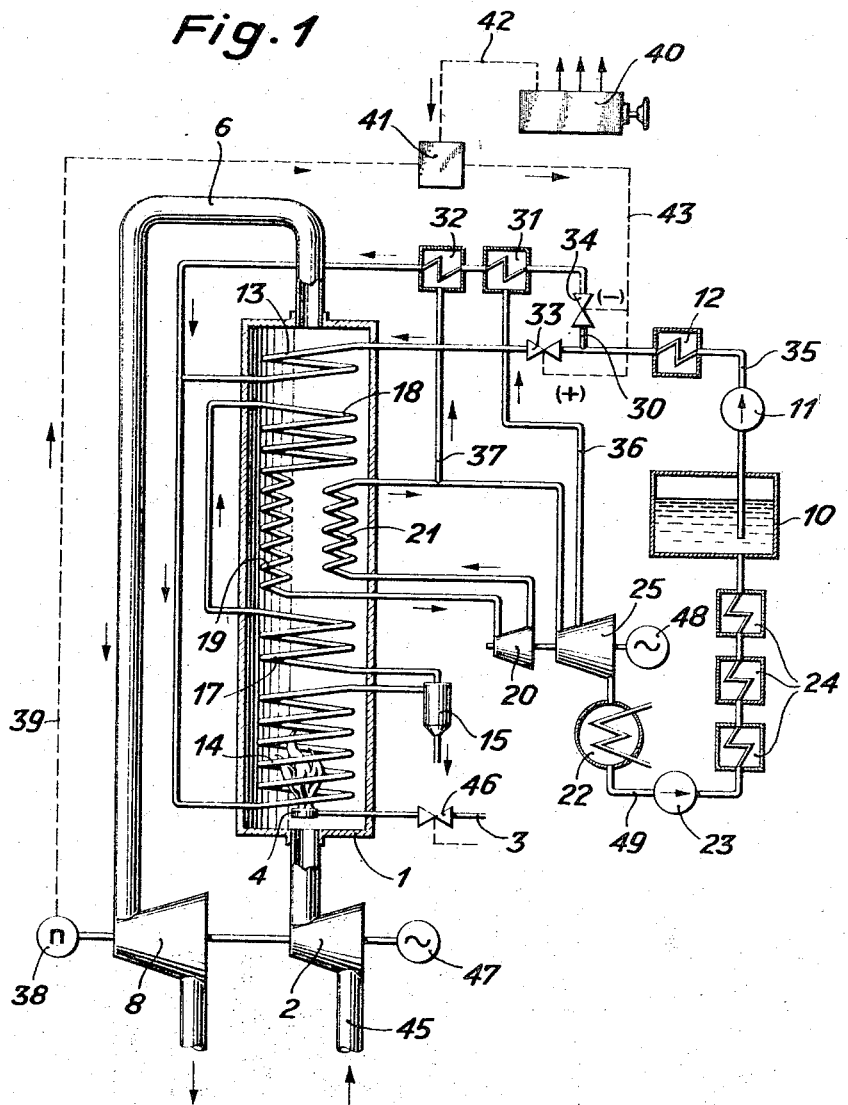
FIG. 1 shows a steam power plant comprising a load-medium pipe or line which bypasses the economiser heating surface of the steam generator.

Referring to FIG. 1, a forced-flow once-through steam generator 1 is charged to a pressure above atmospheric pressure. To this end, combustion-supporting air which is sucked in through a line 45 has its pressure increased in a compressor 2 and is supplied at the increased pressure to the steam generator combustion chamber. Fuel goes through a line 3, including a valve member 46 for controlling the quantity of fuel, to a burner 4.

Disposed in the steam generator 1 are an economiser heating surface 13, an evaporator heating surface 14, a presuperheater heating surface 17, a superheater heating surface 18 and a final superheater heating surface 19, all the heating surfaces being disposed consecutively in relation to the flow of load medium. A liquid trap 15 is interposed between the surfaces 14 and 17. The steam generator also comprises an intermediate auxiliary superheater heating surface 21. The heating surfaces 13, 18, 19, 21 are heated mainly by contact; however, some of the heating surfaces 19, 21 can be of tube panel construction, in which event the tube panel walls are heated mostly by radiation.

Flue gases evolved in combustion flow through the steam generator 1 and, as they do so, yield their heat to the heating surfaces, then leave the generator 1 through a line 6 to which a gas turbine 8 is connected. The shaft of the turbine is coupled, in a manner not shown in any detail, with the shaft of the compressor 2. An electric driving motor 47 is also coupled with the compressor shaft.

The final superheater heating surface 19 is connected to the high-pressure section 20 of a steam turbine plant which also comprises a low-pressure section 25 and which drives an electric generator 48. The intermediate auxiliary superheater heating surface 21 is connected between the high-pressure section 20 and low-pressure section 25 of the steam turbine plant, and a condenser 22 is connected to the exit of the low-pressure section 25. A line 49 extends from the condenser 22 to a feedwater tank 10. Disposed in the line 49 are a condensate pump 23 and three feedwater preheaters 24; the latter are heated by steam bled from the low-pressure section 25 in a manner which is known and not shown. A line 35 extends from the tank 10 to the economiser heating surface 13 and comprises a feed pump 11, a feedwater preheater 12 and an element 33 for adjusting feed quantity. Like the preheaters 24, the preheater 12 is heated by bled steam from the low-pressure section 25. A line 30 branches off between the preheater 12 and the element 33 and joins the load medium flow between the surfaces 13 and 14—i.e., the line 30 bypasses the economiser heating surface 13. The line 30 also comprises a quantity-adjusting element 34 and two preheaters 31, 32; the preheater 31 is heated via a line 36 with steam from the low-pressure section 25 of the steam turbine plant and the preheater 32 is heated via a line 37 either with intermediate superheated steam or with steam from the high-pressure section 20.

A speed-measuring device 38 is connected to the gas turbine shaft and is connected via a signal line 39 to a speed controller 41. A load-controlling device 40 delivers a speed set-value to the controller 41 via a signal line 42. The speed controller 41 is connected via a signal line 43 to the two quantity-controlling elements 33, 34 which, as the plus and minus signs in the brackets in the drawings are adjusted in opposite senses by the controller 41.

The load medium, having been preheated in the economiser heating surface 13 and mostly evaporated in the evaporator heating surface 14, passes to the liquid separator 15 where the unevaporated residue is separated from the steam, whereafter the steam is superheated in the superheater heating surfaces 17–19, then goes to the turbine high-pressure section 20 in which it expands to an intermediate pressure. The partly expanded steam is then superheated in the intermediate auxiliary superheater heating surface 21, then supplied for the remainder of its expansion to the turbine low-pressure section 25, then precipitated in the condenser 22. The condensate goes via the condensate pump 23, line 49 and preheaters 24 to the feedwater tank 10 whence the feed pump 11 supplies the water again to the steam generator through the line 35. The load medium flow delivered by the feed pump 11 is divided by the elements 33, 34 between the economiser heating surface 13 and the associated bypass line 30. By varying the distribution of the two component load medium flows, heat exchange between the flue gases and the load medium in the heating surface 13, and therefore the temperature of the flue gases leaving the steam generator, can be controlled.

When the signal which the device 38 delivers to the line 39 is less than the set-value signal in the line 42—i.e., when the load is increasing—the element 34 is operated in an opening sense and the element 33 is operated in a closing sense. Consequently, the quantity of load medium flowing through the economiser heating surface 13 is reduced, the heat taken from the flue gases in the surface 13 is reduced, and the temperature of the flue gases in the line 6 increases. The result of this increase in flue gas temperature is that the speed of the turbo-group 8, 2 rises. Consequently, the pressure of the flue gases in the steam generator increases, with the result that the heat taken up by the load medium in the contact heating surface increases. When the speed signal in the line 30 is greater than the set-value signal in the line 42, the elements 33, 34 act accordingly to reduce the flow of load medium through the line 30 and increase the flow of load medium through the economiser heating surface 13, so that the flue gases reaching the gas turbine 8 experience increased cooling. The speed of the turbo-group 8, and therefore the pressure of the flue gases in the steam generator decrease, with the further result that the transfer of heat from the flue gases to the load medium in the contact-heated heating surfaces decreases.

In this plant, the speed set-value given by the load-controlling device 40 can be flatter in dependence upon steam generator load than can the speed set-value in a plant without a bypass line 30. Consequently—and except for the first stage of plant start-up—the extra drive of the group 8, 2 by the electric motor 47 can be avoided in the load range usually covered by the steam power plant. The motor 47 drives the group 8, 2 only during the first stage of start-up and up to a desired speed, whereafter the group 8, 2 can be run up to higher load by means of the plant alone.

The two elements 33, 34 can be controlled in another way. To this end, the element 34 can be in the fully closed state at a medium load on the generator at which, by virtue of appropriate design, the turbo-group 8, 2 runs in optimum conditions, the element 34 opening for a load increase and for a load decrease. This step helps to compensate for the fall-off in efficiency of the group 8, 2 on both sides of the optimum value. To optimise the overall efficiency of the plant, it may be advantageous to provide further action on the elements 33, 34 in dependence upon the load.

Figure 2:
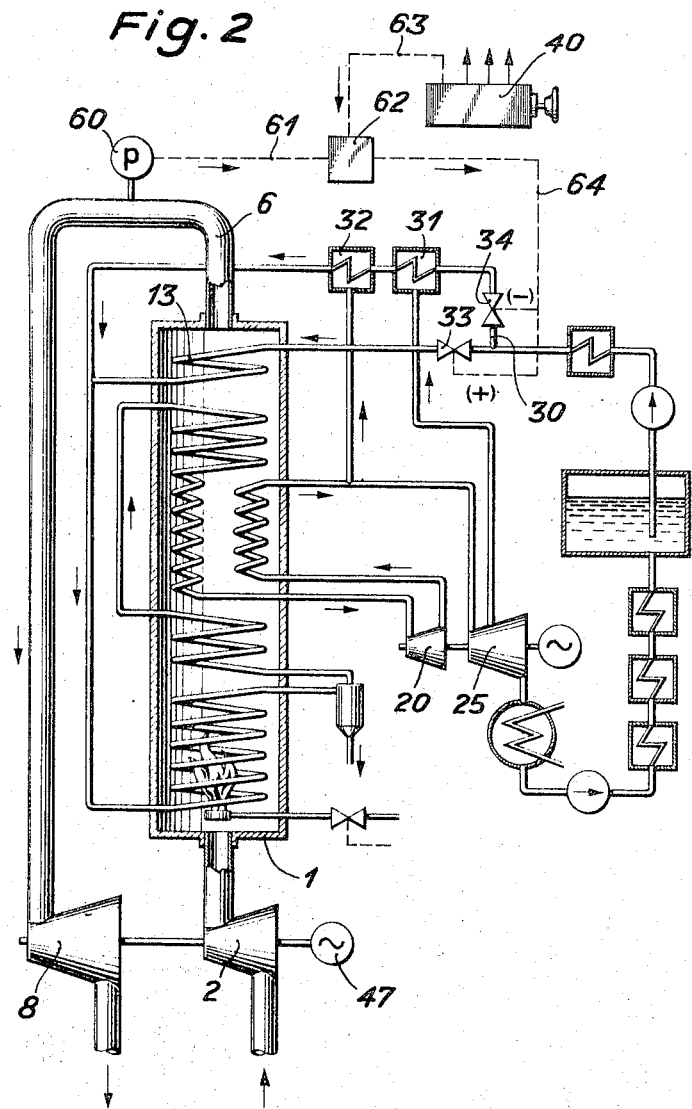
FIG. 2 shows a modification of the steam power plant of FIG. 1.

In the embodiment shown in FIG. 2, the elements 33, 34 are controlled not by the speed of the gas turbine 8, but by flue gas pressure before entry into the gas turbine. Accordingly, a pressure detector 60 is provided on the line 6 and is connected via a signal line 61 to a pressure controller 62 which receives a pressure set-value from the load-controlling device 40 via a signal line 63. The pressure controller 62 is connected via a signal line 64 to the two elements 33, 34 which, as in the example shown in FIG. 1, are adjusted in opposite senses to one another. When flue gas pressure in the line 6 rises, the signal in the line 61 becomes greater than the set-value signal on the line 63, so that, via the signal line 64, the element 33 is operated in the sense of an opening and the element 34 is operated in the sense of a closure. Events then proceed as described with reference to the embodiment of FIG. 1.

Figure 3:
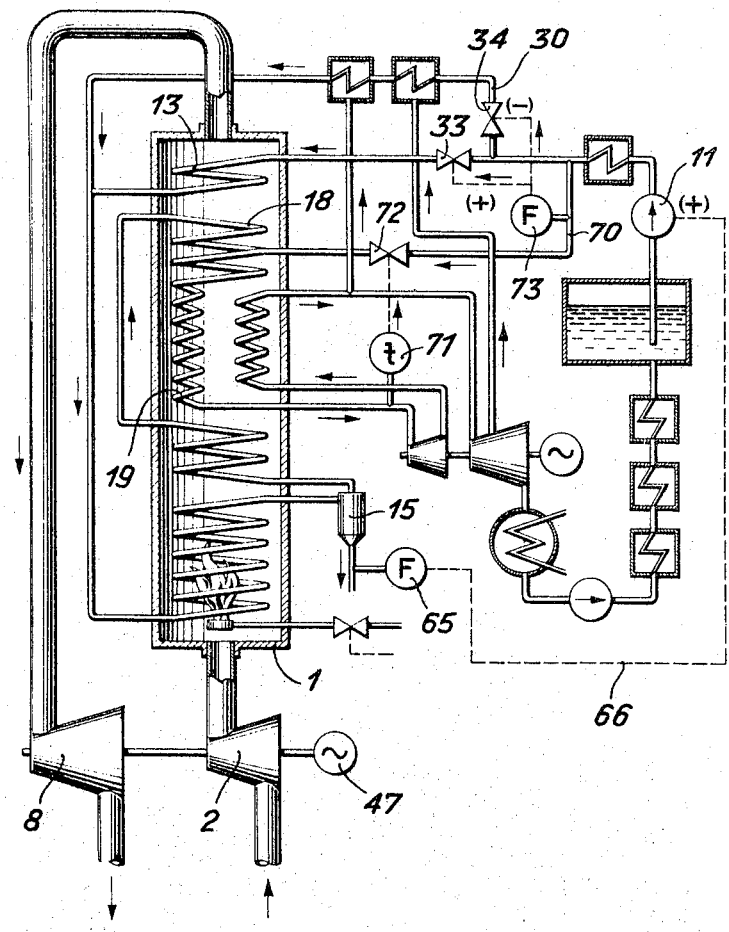
FIG. 3 shows another modification of the steam power plant of FIG. 1.

In the embodiment shown in FIG. 3, the elements 33, 34 are controlled in dependence upon the quantity of water injected, the injected water going through a line 70 to the superheater heating surface 18 to control the steam temperature. Accordingly, the final superheater heating surface 19 is followed by a temperature detector 71 which acts independently upon the measured steam temperature to adjust a throttle element 72 in the line 70. A quantity-measuring element 73 is connected to the line 70 to control the elements 33, 34 and adjusts both of them via a slow-acting controller (not shown). This arrangement makes it possible for the quantity of injected water which is supplied to the superheater heating surface 18 to be very small. When the quantity of water injected increases, the element 33 opens further and the element 34 closes further more feed water goes through the economiser heating surface, the flue gas temperature drops, and the result is that the turbo-group 8, 2 reduces the flue gas pressure in the steam generator 1. Less heat is therefore taken from the flue gases near the superheater heating surfaces.

FIG. 3 also shows a known feedwater control wherein the quantity of liquid removed from the trap 15 controls the delivery of the feed pump 11. Connected to the liquid discharge line from the trap 15 controls the delivery of the feed pump 11. Connected to the liquid discharge line from the trap 15 is a quantity-measuring element 65 which is connected to the feed pump 11 via a signal line 66 comprising a controller (not shown).

Figure 4:
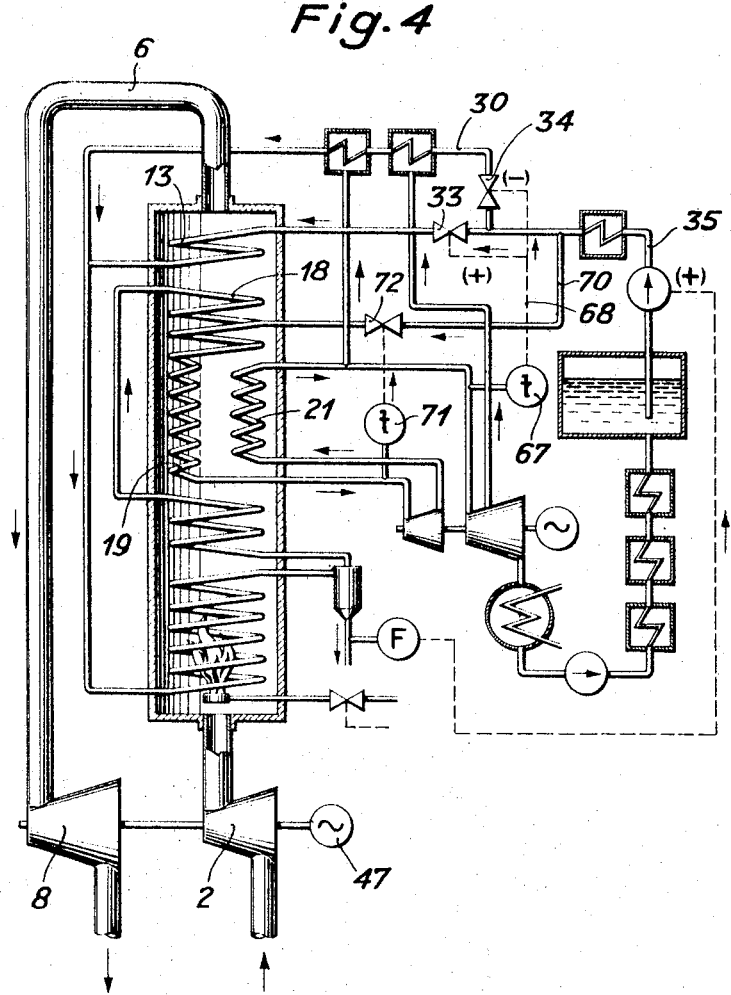
FIG. 4 shows still another modification of the steam power plant of FIG. 1.

The embodiment shown in FIG. 4 is very similar to the embodiment shown in FIG. 3, water being injected into the superheater heating surface 18 to control the steam temperature. However, in FIG. 4, the two elements 33, 34 operate in dependence upon the exit temperature of the intermediate superheater heating surface 21. Accordingly, a temperature detector 67 is provided at the end of the surface 21 and is connected via a signal line 68 to the two elements 33, 34. The signal line 68 also includes a controller (not shown). When the exit temperature of the intermediately superheated steam rises, the elements 33, 34 are operated via the signal line 68, the element 33 opening further and the element 34 closing further. The flue gases passing over the economiser heating surface 13 are therefore cooled more. In a variant, the two elements 33, 34 can be replaced by a single-casing type distributing element disposed at the place where the line 30 branches off from the line 35.

In the example shown in FIG. 5, to vary heat transfer from the flue gases to the load medium, the quantity of gases passing over the economiser heating surface is varied in dependence upon load. A line 50 is connected to the steam generator 1 before—as considered in the direction of flue gas flow—the place where the line 6 branches off; the line 50 extends to the line 6 to the gas turbine. At the junction of the line 50 and line 6 there is a distributing flap 51 which the load-controlling device 40 controls via a servomotor 52. In this example the economiser heating surface 13 comprises three consecutive portions with a respective feedwater preheater 12, 53, 54 before each portion. As in the other examples, the preheaters are heated by bled steam from the low-pressure section 25 of the turbine plant or by intermediately superheated steam or bled steam from the high-pressure section 20. For the rest, the plant is identical to the plant shown in FIG. 1. The embodiment shown in FIG. 5 has the advantage of low inertia—i.e., the tempeature of the flue gases before the gas turbine 8 can be controlled with substantially zero delay. As the load increases—i.e., there is more heating of the contact heating surfaces—the flap 51 is adjusted to increase the quantity of flue gas flowing through the line 50, whereas the quantity of flue gas flowing via the economiser heating surface 13 to the line 6 is simultaneously decreased. When steam generator load decreases, the flap 51 is operated the other way round—i.e., the quantity flowing through the line 50 is reduced, and the quantity flowing over the economiser heating surface 13 is correspondingly increased.

In the embodiments shown, all the heating surfaces are shown as a tube strand. If required, any heating surface can take the form of a number of tubes through which the load medium flows in parallel. Also, as well as in the economiser heating surface or instead of in the economiser heating surface, the heat transfer from the flue gases to the load medium can be varied in other heating surfaces in the contact section of the vapor generator; for instance, some of a number of parallel connected tubes of the superheater heating surface 18 can have the flow of load medium through them reduced or cut off. An essential proviso in this context is that the superheater heating surface must be in such a temperature zone of the steam generator as offers no temperatures which are dangerous for the superheater. Similarly, the line 50 in the embodiment shown in FIG. 5 can be disposed further forwards in the generator 1 relatively to the flue gas flow, for instance, at the level of the transition from the superheater heating surface 18 to the final superheater heating surface 19. Also, heating surfaces, for instance, for preheating the air for combustion, can be provided downstream of the gas turbine 8.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:
1. A steam power plant comprising
a steam generator for transferring heat from a heated flue gas conveyed therethrough to a load medium conveyed in a load medium line therethrough in a flow path opposite to the flow path of the heated flue gas, said steam generator having a flue gas discharge end and an economiser in said flow medium line at the discharge end thereof,
a flue gas discharge line connected at one end to said discharge end of said steam generator,
a gas turbine operably connected to the other end of said flue gas discharge line whereby said gas turbine is driven by the flue gas discharged from said steam generator,
a compressor operably connected to said gas turbine to be driven thereby for compressing the combustion supporting air delivered to said generator, and
an economiser bypass means for varying the proportional distribution between the load medium and heated flue gas as between respective flow paths to vary the heat transfer between the heated flue gas and load medium whereby the temperature of the flue gas discharged from said steam generator is controlled.
2. A steam power plant as set forth in claim 1 wherein said economiser bypass means includes a flue gas bypass discharge pipe positioned in said steam generator in advance of said economiser with respect to the flow path of the heated flue gas for discharging a variable quantity of flue gas therethrough to said flue gas discharge pipe to avoid heat exchange contact of the discharged variable quantity of flue gas with said economiser.
3. A steam power plant as set forth in claim 2 further comprising an adjusting means in said flue gas bypass discharge pipe for varying the quantity of flue gas discharged therethrough, and a load control device for controlling the operation of said adjusting means.
4. A steam power plant as set forth in claim 1 wherein said economiser bypass means includes a load medium bypass line for conveying a variable quantity of delivered load medium past said economiser.
5. A steam power plant as set forth in claim 4 further comprising a turbine operably connected in the flow path of the load medium downstream of said steam generator with respect to the flow of the load medium, means for bleeding steam from said turbine, and a plurality of feedwater preheaters interposed in said load medium bypass line, said feedwater preheaters being operably connected to said means for bleeding steam for heating of the load medium flowing through said preheaters.
6. A steam power plant as set forth in claim 4 further comprising a first flow control element in said load medium bypass line and a second flow control element in said load medium line in advance of said economiser.
7. A steam power plant as set forth in claim 6 wherein a controller is operably connected to said first and sec- ond flow control elements and to said gas turbine for controlling the operation of said flow control elements in response to the speed of said gas turbine.

8. A steam power plant as set forth in claim 7 further comprising a load controlling device, and said controller includes a set-value input operably connected to said load controlling device.

9. A steam power plant as set forth in claim 6 further comprising water injection means interposed in said load medium line between a point upstream of said first flow control element and a point downstream of said economiser for controlling the steam temperature in said steam generator, and an injection controller operatively connected to said water injection means and to said first and second flow control elements for controlling the operation of said control elements in response to the flow of water through said water injection means.

10. A steam power plant as set forth in claim 6 further comprising water injection means interposed in said load medium line between a point upstream of said first flow control element and a point downstream of said economiser for controlling the steam temperature in said steam generator, an intermediate auxiliary superheater in said steam generator in said load medium line downstream of said economiser having an exit end, and an injection controller operably connected to said exit end of said intermediate auxiliary superheater for detecting the steam temperature therein and said flow control elements for controlling the operation of said flow control elements in response to the detected steam temperature.

11. A steam power plant as set forth in claim 1 wherein said steam generator is a forced flow once-through steam generator, which further includes an evaporator and a superheater heating surface disposed in said load medium line downstream of said economiser, and a liquid trap disposed in said load medium line between said evaporator and said superheater heating surface.

References Cited
UNITED STATES PATENTS

| | | | |
|---|---|---|---|
| 2,848,983 | 8/1958 | Lieberherr | 122—479 |
| 2,852,005 | 9/1958 | Buri | 122—479 |

FOREIGN PATENTS 738,286  10/1955  Great Britain.

CARLTON R. CROYLE, *Primary Examiner.*